UNITED STATES PATENT OFFICE.

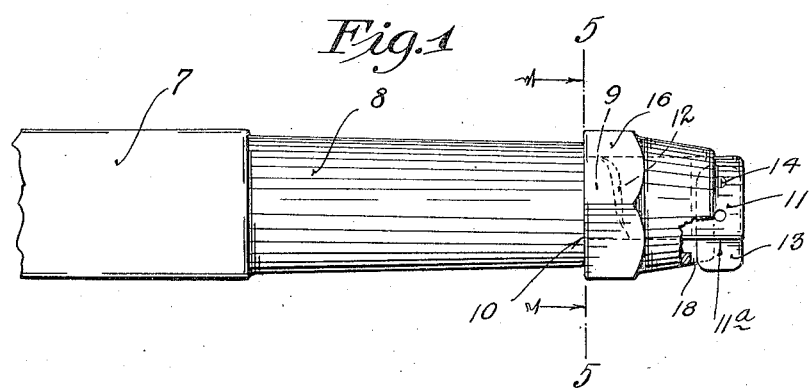
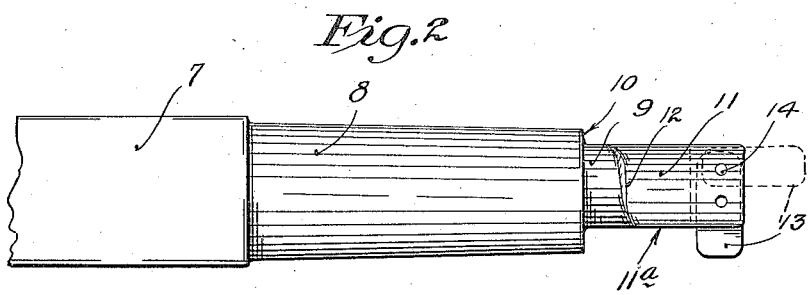
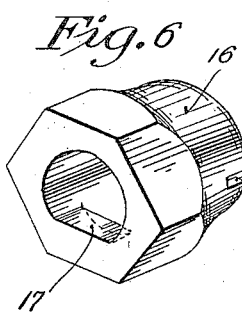 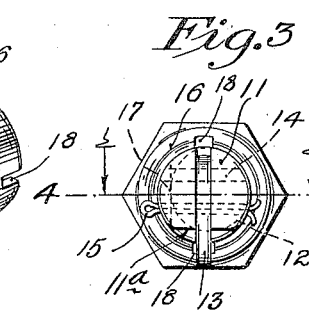 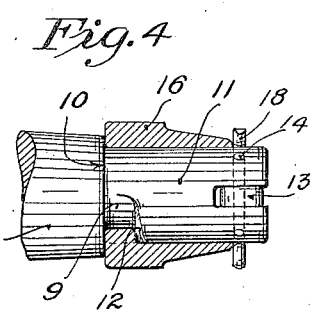
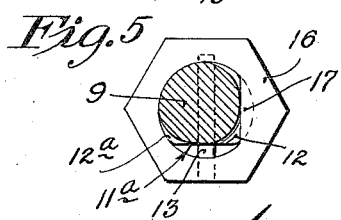

EDWARD J. BRICKER, OF MINNEAPOLIS, MINNESOTA, ASSIGNOR OF ONE-HALF TO CARL G. BREVES, OF MINNEAPOLIS, MINNESOTA.

AXLE LOCK-NUT.

1,363,452.  Specification of Letters Patent.  Patented Dec. 28, 1920.

Application filed February 6, 1920. Serial No. 356,603.

*To all whom it may concern:*

Be it known that I, EDWARD J. BRICKER, a citizen of the United States, residing at Minneapolis, in the county of Hennepin and State of Minnesota, have invented certain new and useful Improvements in Axle Lock-Nuts; and I do hereby declare the following to be a full, clear, and exact description of the invention, such as will enable others skilled in the art to which it appertains to make and use the same.

My present invention has for its object to provide an improved lock nut especially adapted for application to the ends of vehicle axles to hold the wheels in position on the journals of the axles. The nut is what may be designated as a threadless nut, because neither the nut nor the engaged end of the axle are threaded. The nut is adapted to be slid axially to and from working position without rotation, and then to be locked to the axle by a slight rotation, and in such interlocked position, to be secured by a small lock lever or arm which will engage with notches in the axle and nut to positively hold the nut against rotation and interlocked to the axle. This lock lever or arm, in turn, may be secured in operating position by a split key or pin to positively prevent the former from being accidentally moved from working position.

The preferred form of the invention is illustrated in the accompanying drawings wherein like characters indicate like parts throughout the several views.

Referring to the drawings:

Figure 1 is a side elevation showing one end of the axle and a lock nut applied thereto in accordance with my invention;

Fig. 2 is a view corresponding to Fig. 1, but with the nut removed;

Fig. 3 is an end elevation of the parts shown in Fig. 1;

Fig. 4 is a view partly in plan and partly in horizontal section on the line 4—4 of Fig. 3;

Fig. 5 is a section on the line 5—5 of Fig. 1; and

Fig. 6 is a perspective view of the lock nut removed from working position.

The numeral 7 indicates an axle having a wheel journal 8, and at the end of the journal, a reduced neck 9 connected thereto by a shoulder 10.

The neck 9 has a cylindrical head portion 11 which, at one side, is tangential with the neck portion 9, and, at the opposite side, projects radially to afford a shoulder 12 that is offset outward from the shoulder 10 of the axle. The head portion 11, at its under side, is cut away at 11ª on the line of a chord that is tangential to the neck portion 9. The outer end of the head 11 is grooved vertically and pivoted therein to the said head is a lock lever or arm 13, the pivot 14 of which is above the axis of the same head. By means of a split key 15, or similar device inserted through coincident perforations in the head 11, said lever 13 is adapted to lock in its downturned position with its lower end projecting below the head, as shown in Fig. 2.

The lock nut is in the form of a sleeve 16 that is provided with a bore or axial passage that fits the cylindrical surface of the head 11. At its inner end, this nut is provided with a lock flange 17 that extends on the chord of the cylindrical surface of the head 11 corresponding to the flattened lower surface 11ª of the latter, so that the said nut, when its lock flange 17 is alined with the flattened surface 11ª, is adapted to be slid axially to working position shown in Figs. 1 and 4, and is then adapted to be given a quarter rotation into the position shown in Figs. 3 and 5. When the nut is turned to the position shown in Figs. 3 and 5, and also in Fig. 4, the flange 17 will be engaged between the shoulders 10 and 12, and thus interlocked to the axle. The shoulder 12 is slightly spiral, so that it has a camming action on the flange 17, which draws the nut tightly against the shoulder 10. When the nut is applied, as just described, and the lock lever 13 is turned down and secured, as noted, its lower end engages with a notch 18 in the outer end of the nut 16, and thereby positively locks the said nut in its position interlocked to the axle, thus affording a sort of double lock for securing the nut to the axle.

It will be noted that the cylindrical surface of the head portion 11 is concentric to the axis of the journal 8 but that the reduced neck portion 9 is eccentric both to said head and journal. This locates the nut concentric to the journal.

Even if the pin 15 should come out of position, which is hardly possible, the lever 13 will be gravity held in locking position.

The nut can be removed from the axle only when the straight surface of its flange 17 is accurately alined with the flat surface 11ª, and if the nut should be turned slightly too far backward, or in a clockwise direction in respect to Fig. 5, its flange 17 will be engaged with a supplemental shoulder 12ª of the head 11 and would even then be held against axial displacement, so that the nut would hold the wheel from coming off.

The lock nut, so-called, therefore, affords the best kind of security against accidental displacement of the wheel on an axle, but, nevertheless, when desired, the nut can be very quickly removed or applied, and moreover, it may be made at reasonably small cost.

What I claim is:

1. The combination with an axle provided at its end with a reduced neck portion forming an annular shoulder on the axle and a head with a segmental portion opposite said annular shoulder, and the said head being flattened at one side, of a sleeve-like nut having at its inner end a lock flange that extends approximately on the line of a chord of the cylindrical surface thereof, and which lock flange, when turned into alinement with the flattened surface of said head, adapts said nut to be slid thereon to and from working position, the said nut, when in working position, being rotatable to engage its lock flange between the two shoulders noted.

2. The combination with an axle provided at its end with a reduced neck portion forming an annular shoulder on the axle and a head with a segmental portion opposite said annular shoulder, and the said head being flattened at one side, of a sleeve-like nut having at its inner end a lock flange that extends approximately on the line of a chord of the cylindrical surface thereof, and which lock flange, when turned into alinement with the flattened surface of said head, adapts said nut to be slid thereon to and from working position, the said nut, when in working position, being rotatable to engage its lock flange between the two shoulders noted, said segmental lock flange having a cam action which forces the nut against said annular shoulder.

3. The combination with an axle provided at its end with a reduced neck portion forming an annular shoulder on the axle and a head with a segmental portion opposite said annular shoulder, and the said head being flattened at one side, of a sleeve-like nut having at its inner end a lock flange that extends approximately on the line of a chord of the cylindrical surface thereof, and which lock flange, when turned into alinement with the flattened surface of said head, adapts said nut to be slid thereon to and from working position, the said nut, when in working position, being rotatable to engage its lock flange between the two shoulders noted, said segmental lock flange having a cam action which forces the nut against said annular shoulder, and means for locking said nut with its lock flange pressed between said two lock shoulders.

4. The combination with an axle provided at its end with a reduced neck portion forming an annular shoulder on the axle and a head with a segmental portion opposite said annular shoulder, and the said head being flattened at one side, of a sleeve-like nut having at its inner end a lock flange that extends approximately on the line of a chord of the cylindrical surface thereof, and which lock flange, when turned into alinement with the flattened surface of said head, adapts said nut to be slid thereon to and from working position, the said nut, when in working position, being rotatable to engage its lock flange between the two shoulders noted, said reduced neck being eccentric to the axis of said axle and the head thereof being concentric to the axis of said axle.

5. The combination with an axle and a reduced neck forming a shoulder therewith, said neck having an enlarged head of cylindrical form tangential therewith at one point but formed flat at an opposite point, said head forming a shoulder opposite to the first noted shoulder of said axle, the outer end of said head being bifurcated, and a sleeve-like nut having at its inner end a lock flange that extends on the line of a chord of its cylindrical surface, and which, when turned into alinement with the flattened surface of said head adapts the nut to be slid thereon, to and from working position, the said nut when in working position being slidable to engage the lock flange between the two shoulders noted, the said head having an auxiliary lock shoulder with which the lock of said nut is engageable when rotated backward from its normal interlocked position, beyond the position in which said lock flange alines with the flattened surface of said head.

In testimony whereof I affix my signature in presence of two witnesses.

EDWARD J. BRICKER.

Witnesses:
HARRY D. KILGORE,
BERNICE G. BAUMANN.